Patented Jan. 19, 1932

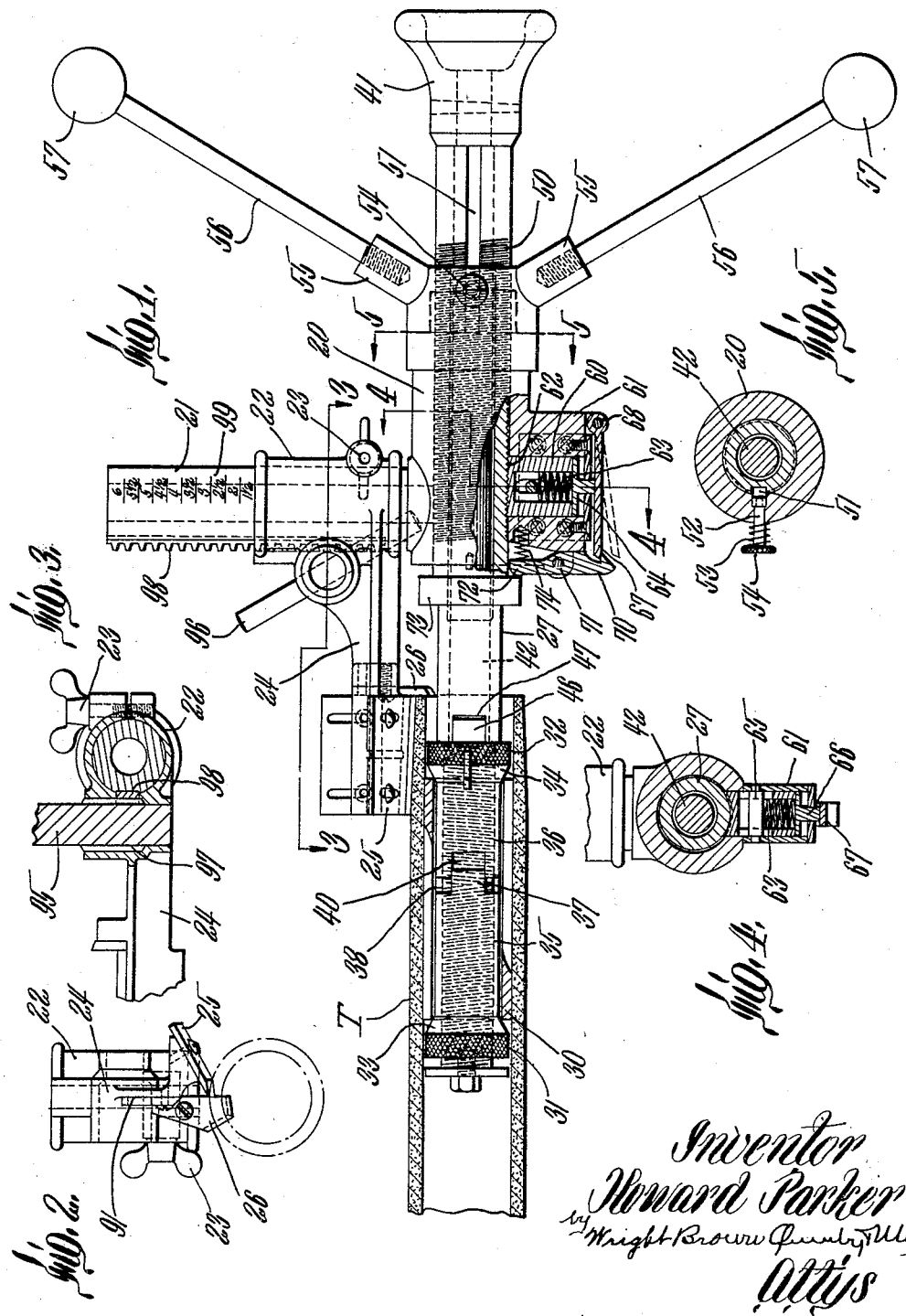

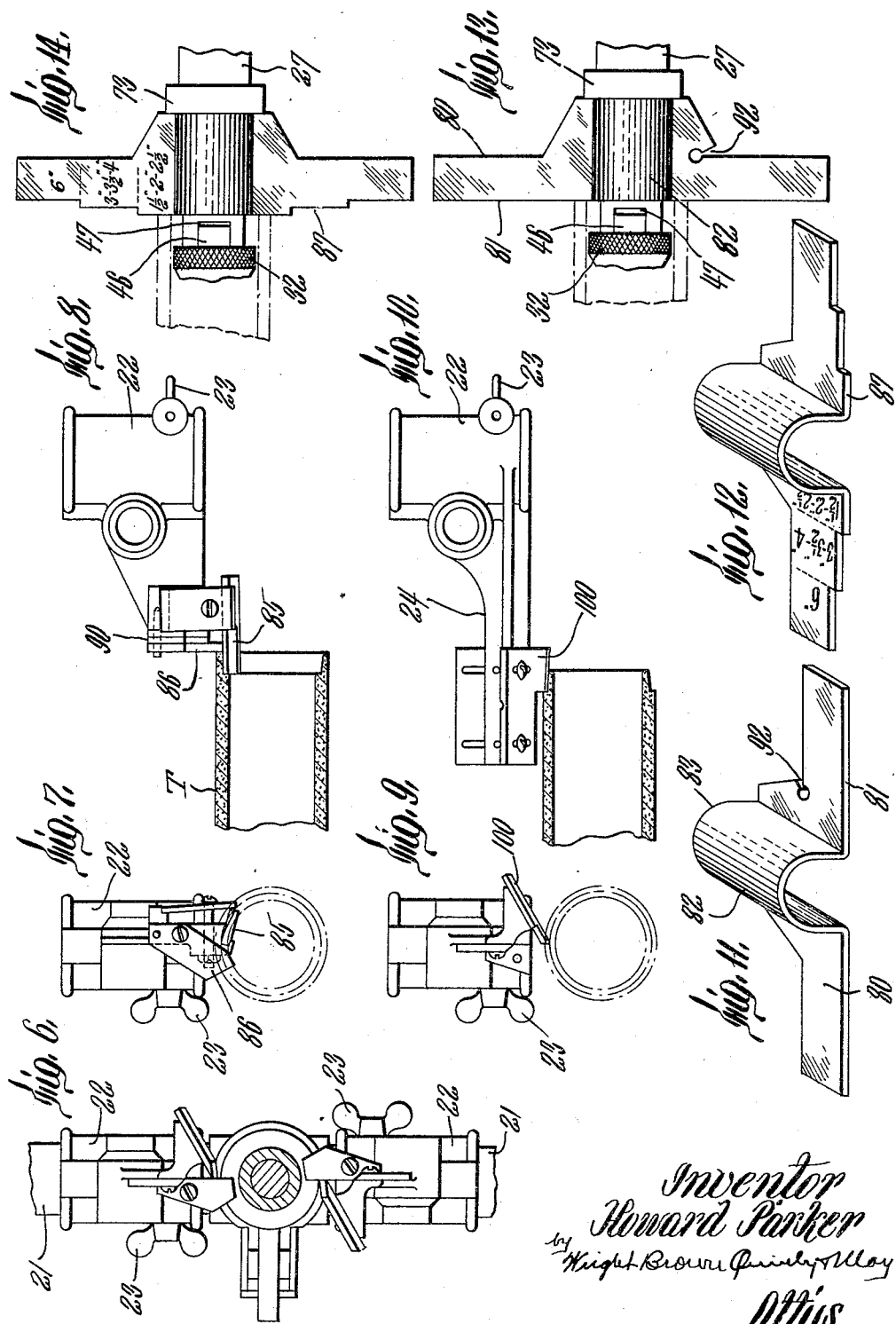

1,841,550

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

PIPE TRIMMING APPARATUS

Application filed September 5, 1930. Serial No. 479,885.

This invention relates to a portable mechanism for trimming the ends of fiber tubes and the like. An object of the invention is to provide a simple mechanism which is relatively light and inexpensive but which is capable of trimming accurately the ends of fiber tubes so that tight drive joints or taper joints may be made. Tubing of the type for which the trimming apparatus is especially designed may be made by winding a sheet of wet wood pulp upon a mandrel in successive convolutions under pressure until the desired wall thickness is built up. The tube thus formed is removed from the mandrel and carefully dried. The winding of the wet pulp under pressure results in a strong interfelting of the successive convolutions so that the wall of the dried tube is compact and tough. These tubes may be waterproofed by suitable treatment with pitch, asphalt, or other similar substances. This increases their mechanical strength as well as rendering them serviceable for various uses such as water pipe and conduit for telephone lines and power cables. Tubing of this type is customarily made at the mill in sections of definite length. The ends of each of these sections may be readily and conveniently trimmed at the mill by suitable machinery for the type of joint desired. For example, the sections may have both ends slightly tapered for the purpose of forming drive joints with suitable coupling callars, each collar receiving the ends of two sections of pipe with a wedging fit. The end portions may also be trimmed to form taper joints. In such cases one end of the pipe is trimmed on its outer surface to a taper, the other end of the pipe being trimmed on its inner surface with a corresponding hollow taper to receive the complemental end of another section of pipe. This type of joint leaves the outer surfaces of the joined pipes flush. When pipes are laid together on a job to form a continuous conduit, it is frequently necessary to use a piece less than the standard length in order, for example, to install a bend at the right place. In such case a section of standard length must be cut up to supply a shorter piece of the desired special length. It is essential therefore that a suitable trimming mechanism be conveniently available to trim the cut end of the shorter section so as to shape it properly for a tight joint.

According to the invention a simple portable mechanism is provided which is capable of trimming the ends of tubes accurately to form any desired type of joint. The mechanism is furthermore adjustable for operation on pipes of different diameters. According to the invention, a device is included in the mechanism whereby the trimming cut on the end portion of a pipe proceeds to the desired point then automatically stops.

For a more complete understanding of the structure and operation of the invention reference may be had to the description which follows and to the drawings of which,—

Figure 1 is an elevation of a mechanism embodying the invention, a portion being broken away to show certain of the parts in section.

Figure 2 is an end elevation of the tool holder shown in Figure 1.

Figure 3 is a section on the line 3—3 of Figure 1.

Figure 4 is a section on the line 4—4 of Figure 1.

Figure 5 is a section on the line 5—5 of Figure 1.

Figure 6 is an end elevation of a modified form of tool carriage.

Figure 7 is an end elevation of the tool carriage with tools for trimming the interior of a pipe end.

Figure 8 is a side elevation of the carrier and tools shown in Figure 7.

Figure 9 is an end elevation of a tool carriage with a tool for trimming a pipe end for a taper joint.

Figure 10 is a side elevation of the same.

Figure 11 is a perspective view of a gauge for regulating the distance of cut from the end of a pipe in forming the male member of a taper joint.

Figure 12 is a perspective view of a gauge determining the length of cut from the end of a pipe in forming a female member of a taper joint, this gauge being adapted for use with pipes of various diameters.

Figures 13 and 14 are elevations of gauges shown in Figures 11 and 12 showing the manner of their use.

The mechanism illustrated in Figure 1 may comprise a revoluble tubular body 20 from one side of which projects a tubular arm 21 having a tool carriage 22 slidable thereon radially from the body 20. The carriage 22 includes a split cylinder, the edges of which may be drawn together as by a thumb screw 23 to clamp the carriage in any position of adjustment on the arm 21. Projecting laterally from the cylindrical portion of the carriage 22 is a bracket 24 to the outward end of which is attached suitable cutting tools such as a side trimmer 25 and an end trimmer or squaring tool 26. In the example illustrated in Figure 1 the trimming tool 25 has a cutting edge at an angle to the axis of the body 20 so that it trims the end of a tube "T" to taper form when the latter is held in proper position for trimming. The body 20 is revolubly mounted on a tubular axle 27 at one end of which is carried an expansible chuck or mandrel 30 to grip and support the tube T to be trimmed. The chuck 30 may be a cylinder having slits extending alternately from opposite ends. In order to expand this chuck to grip the inner wall of the tube T, a pair of nuts 31 and 32 may be provided having conical faces 33 and 34 respectively, entering the ends of the chuck 30. When the nuts 31 and 32 are drawn toward each other, the conical faces 33 and 34 exert a wedging action within the ends of the chuck causing the chuck to expand and thus to grip the tube T from within. In order to draw the nuts toward each other, the nuts may be provided respectively with extensions 35 and 36 which project toward each other and which are formed at their ends with alternate lugs 37 and recesses 38, the lugs of one nut fitting into the recesses of the other and vice versa. This structure permits relative axial movement of the two nuts but prevents relative rotation thereof. One of the nuts 31 and 32 is provided with a right hand screw thread, the other being provided with a left hand screw thread. The nuts are screwed onto a threaded member 40 which has a right hand screw thread to receive the nut 31 and a left hand screw thread to receive the nut 32. The threaded member 40 is connected to a handle 41 by a stem 42 which extends rearwardly through the hollow axle 27. A lug 46 on the nut 32 projects into a corresponding recess 47 in the forward end of the axle 27 so that these members are held against relative rotation. When it is desired to insert the mandrel in the end of a tube T, the nuts 31 and 32 are backed away from each other to permit the mandrel 30 to contract. This may be done by holding the nuts against rotation and turning the member 40 by the handle 41. Since the nuts are not rotatable relatively to the axle 27, the latter may be held when the handle 41 is turned. The rearward portion of the axle 27 is threaded on its exterior surface as at 50. The hollow body 20 is fitted over the rearward portion of the axle and is rotatable thereon. In order to facilitate the holding of the axle 27 it may be slotted as at 51, the slot being adapted to receive the inner end of the plunger 52 which is normally held out of the slot by a spring 53. The plunger 52 may be provided with a suitable head 54. By pressing the head 54 to push the inner end of the plunger into the slot 51, the axle 27 and hence the nuts 31 and 32 are held against rotation relative to the body 20. To facilitate holding the body 20 against rotation, a pair of lugs 55 may extend diagonally out from the rearward end thereof, these lugs being threaded to receive suitable arms 56 terminating in knobs or handles 57. These handles are also for the purpose of rotating the body 20 and the tool carriage. When the plunger 52 is compressed so as to enter the slot 51, the nuts 31 and 32 may conveniently be held against rotation by holding one of the arms 56. If, then, the handle 41 is rotated, the rotation of the threaded member 40 will cause the nuts 31 and 32 to move toward or away from each other since their screw threads are in opposite directions. Thus the mandrel 30 may be readily expanded as desired to grip the inside of the tube T.

It is desirable in cutting a taper end on a tube to feed the tool carriage axially with respect to the tube in such a way that a uniform rate of cutting is maintained and a chip of suitable thickness is removed. A device for feeding the tool carriage along the work is illustrated in Figure 1. A feeding block 60 is carried by the body 20 in a housing 61 projecting laterally from the body. The block 60 has a threaded face as at 62, this face being movable into or out of threaded engagement with the thread 50 on the axle 27, the block being radially slidable within the housing 61. In order to provide for the automatic release of the block 60 from threaded engagement with the thread 50 when the cutting tool has progressed a predetermined distance along the work, the block may be made hollow to contain a spring 63 pressing within against the end 64 of the block and against a pin 65, the ends of which are fixed in the side walls of the housing 61. The spring 63 thus tends to press the block 60 outwardly to an inoperative position. The block, however, is provided with an outwardly projecting lug 66 which abuts a lever 67 pivoted as at 68 to the housing 61. The free end of this lever is caught by the end 70 of a latch which is pivoted as at 71. The opposite end 72 of this latch is adapted to engage a collar 73 fixed on the axle 27 when the body 20 is moved forwardly a sufficient distance. A suitable spring 74 maintains the latch 70 in engagement with the free end of the lever 67 until the latch is tripped by engagement with the collar 73. It is evident that when the device is set with the block 60 in operative engagement, rotation of the body 20 with the tool carriage will result in the forward movement of the body and the tool along the work until the latch 70 is tripped by engagement of its end 72 with the collar 73. This releases the lever 67 and permits the block 60 to spring outwardly to its inoperative position, thus stopping the forward feeding movement of the tool regardless of further rotation of the body 20 and the tool carriage.

It is obvious that when the mandrel 30 is clamped in the end of a tube, the distance of cut will depend on the distance to which the mandrel is originally inserted. To facilitate the insertion of the mandrel to the correct distance within the end of the tube to be trimmed, I may provide a gauge such as illustrated in Figures 11 and 12. In Figure 11 is illustrated a gauge 80 constructed of a piece of sheet metal having a straight edge 81, the central portion of the strip being bent into U-shape as at 82 so as to fit over the portion of the axle 27 which is immediately forward of the collar 73. The rearward edge 83 of the bent portion of the gauge is adapted to rest against the collar 73 as shown in Figure 13. When in this position the gauge is adapted to receive the end of a tube to be trimmed against its forward edge 81, the distance from the forward edge 81 to the rearward edge 83 being related to the distance of the trimming tool 26 from the collar 73 so that when the latch 70 reaches the collar 73 the end of the trimming tool 26 will have cut off just sufficient material from the end of the tube to leave a smoothly trimmed end edge without cutting away any more material than necessary.

In Figure 12 is illustrated a somewhat similar gauge, this gauge being adapted particularly for use in cutting the female portion of taper joints such as is illustrated in Figure 8. As therein shown a tool 85 is provided to trim the inner surface of the end of the tube T, a squaring tool 86 being also provided to trim the end of the tube. The gauge illustrated in Figure 12 has a stepped forward edge 87 as shown. It is evident from Figure 14 that for the larger sizes of pipe, the tool 85 will be permitted to penetrate more deeply into the end of the tube, this being for the purpose of giving a longer joint for pipes of larger sizes. In order to prevent the corresponding trimming off of the ends of the larger pipe when the ends are allowed to project nearer to the collar 73 than the ends of the smaller sizes of pipe, the squaring tool 86 must also be moved rearward. For the purpose, this tool is spaced from the tool holder by one or more spacing blocks or shims 90. These shims may be removed as desired to set the squaring tool 86 further rearwardly and thus to permit the trimming tool 85 to make a deeper cut within the end of the tube T.

In order to prevent the tool 25 from making a hollow cut, i. e. a curved taper, on the end of the tube T it is essential that its cutting edge be in a plane which also contains the axis of rotation of the body 20. To this end the bracket 24 is provided with a gauging face 91, the plane of which contains the axis of rotation of the body 20. The tool 25 must be adjusted so that its cutting edge lines up with this face 91. In order to cut the chip properly from the tube end with the most efficiency and with minimum wear of the tool 25, the latter may be secured to the bracket 24 at an angle as illustrated in Figure 2. The bevel of the cutting edge of the tool is preferably at the angle shown so that the beveled face is nearly tangent to the tube at the line of cut. It is important that this angle of bevel be carefully maintained when the tool is sharpened. For this purpose I may provide a suitable angle gauge 92 on the gauge 80, the sides of the angle gauge 92 being adapted to receive the beveled edge of the cutting tool. If the sides of the bevel fit accurately in the opening 92, the angle of bevel on the cutting edge of the tool is correct. To facilitate the radial adjustment of the tool carriage for tubes of different diameters I may employ a suitable key having a stem 95 with a handle 96 at one end and a series of teeth 97 near the other end. The toothed end of the key may be inserted in a suitable apparatus in the bracket 24 so that the teeth 97 may engage the teeth of the rack 98 fixed to the arm 21. If the thumb screw 23 is loosened, the key may be rotated to slide the tool carriage radially inward or outward, a suitable series of scale markings 99 being provided on the arm 21 to assist in the correct setting of the tool carriage. When the carriage is adjusted properly, the thumb screw 23 may be set up to clamp the carriage firmly in position, the key being then removed.

Figures 6 to 10 inclusive show various arrangements of trimming and squaring tools. In Figure 6 a double set of tools is shown, the tool carriage 22 being duplicated by a similar carriage diametrically opposed thereto. By this structure a smaller chip can be cut by each tool. This tends to make a smoother cut.

Figures 7 and 8 illustrate tools for cutting the female member of a taper joint, the end of the tube being secured in such a position as to permit a fixed depth of cut by the trimming tool 85. Figures 9 and 10 illustrate a tool 100 for cutting the male member of a taper joint. The distance of cut of this tool may be suitably regulated by the use of a gauge 80. If desired a squaring tool, as shown in these figures, may be mounted to said carriage to square the end of the tube.

I claim:

1. Apparatus of the class described comprising a hollow axle having a screw threaded portion, an expansible mandrel mounted adjacent to one end portion of said axle, means for expanding said mandrel extending through and projecting from the opposite end of said axle a hollow body revolubly mounted on said axle, an arm projecting radially from said body, a tool carriage adjustably mounted on said arm, a follower carried by said body, said follower having a grooved face meshing with the thread on said axle, and means for releasing said follower from meshing engagement with said thread.

2. Apparatus of the class described comprising a hollow axle, an expansible mandrel at one end of said axle to receive and grip the end of a tube to be trimmed, a handle at the opposite end of the axle actuable to expand said mandrel, a hollow body slidable on said axle, means for feeding said body toward the mandrel when rotated, means for automatically rendering the feeding means inoperative when the body reaches a predetermined point on said axle, a tool carriage mounted on said body, and means actuable to revolve said body about said axle.

3. Apparatus of the class described comprising an axle having a threaded portion, means carried by said axle for engaging within the end of a tube, a body revoluble on said axle, said body having a threaded element engageable with the threaded portion of the axle to feed said body along said axle, a tool carriage mounted on said body, means for automatically disengaging said element from the thread of the axle when said body reaches a predetermined point in its feeding movement, and a pair of fixed arms projecting from opposite sides of said body to facilitate the rotation thereof.

4. Apparatus of the class described comprising an axle having a screw threaded portion, a work-engaging mandrel at one end of said axle, a body revoluble on said axle, a radially movable follower block carried by said body, said block having a grooved face presented to the surface of the axle for threaded engagement with the threaded portion thereof, a spring pressing said block outward, a latch adapted to hold said block in engagement with the thread on the axle, and a trigger movable to release said latch and block for movement out of engagement with said thread.

5. Apparatus of the class described comprising a hollow axle, a tool carriage revolubly mounted thereon, an expanding mandrel adjacent to the forward end of said axle, means for expanding said mandrel, means rotatable relatively to said axle to operate said expanding means, and means for locking said tool carriage and axle against relative rotation to facilitate holding said axle when said operating means is rotated to expand the mandrel.

6. Apparatus of the class described comprising a hollow axle, a tool carriage revolubly mounted thereon, an expanding mandrel adjacent to the forward end of said axle, said mandrel including two members relatively movable axially but held against rotation relatively to said axle and to each other, a stem extending through said mandrel and axle, said stem having reversely threaded portions in threaded engagement respectively with said two members, and means for locking said carriage against revolution relative to said axle.

7. Apparatus of the class described comprising an axle having a threaded portion and a shoulder, an expansible mandrel mounted adjacent to one end of said axle, a tool carriage revoluble about said axle, a threaded element carried by said tool carriage and movable into and out of threaded engagement with the threaded portion of said axle, means for automatically disengaging said element from said axle when the carriage reaches a predetermined point in its axial movement toward said mandrel, and a removable gauge member adapted to rest against said shoulder as an abutment for positioning work placed on said mandrel.

In testimony whereof I have affixed my signature.

HOWARD PARKER.